(12) United States Patent
Macchia et al.

(10) Patent No.: US 10,060,441 B2
(45) Date of Patent: Aug. 28, 2018

(54) GAS TURBINE STATOR WITH WINGLETS

(71) Applicant: PRATT & WHITNEY CANADA CORP., Longueuil (CA)

(72) Inventors: Enzo Macchia, Kleinburg (CA);
George Guglielmin, Toronto (CA);
Bhawan Patel, Mississauga (CA); Joe Lanzino, Orangeville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 585 days.

(21) Appl. No.: 14/721,609

(22) Filed: May 26, 2015

(65) Prior Publication Data
US 2016/0348694 A1 Dec. 1, 2016

(51) Int. Cl.
F04D 29/54 (2006.01)
F01D 9/04 (2006.01)
F04D 29/32 (2006.01)
F01D 5/14 (2006.01)
F04D 29/68 (2006.01)

(52) U.S. Cl.
CPC ........... *F04D 29/542* (2013.01); *F01D 5/145* (2013.01); *F01D 9/041* (2013.01); *F04D 29/324* (2013.01); *F04D 29/681* (2013.01); *F05D 2230/232* (2013.01); *F05D 2240/122* (2013.01); *F05D 2240/127* (2013.01); *F05D 2240/304* (2013.01); *F05D 2250/11* (2013.01); *F05D 2270/17* (2013.01); *Y02T 50/671* (2013.01); *Y02T 50/673* (2013.01)

(58) Field of Classification Search
CPC .... F04D 29/542; F04D 29/324; F04D 29/681; F05D 2230/232; F05D 2240/122; F05D 2240/126; F05D 2240/127; F05D 2240/304; F05D 2250/11; F05D 2270/17; Y02E 50/671; Y02E 50/673; F01D 5/00; F01D 5/141; F01D 5/145; F01D 9/02; F01D 9/041
USPC .......................................................... 60/805
See application file for complete search history.

(56) References Cited

U.S. PATENT DOCUMENTS

| | | | | |
|---|---|---|---|---|
| 3,193,185 A | * | 7/1965 | Erwin | F01D 5/145 415/193 |
| 3,524,712 A | * | 8/1970 | Petrie | F01D 5/145 416/191 |
| 3,776,363 A | | 12/1973 | Kuethe | |
| 4,108,573 A | | 8/1978 | Wagner | |

(Continued)

FOREIGN PATENT DOCUMENTS

| | | |
|---|---|---|
| FR | 2867506 | 9/2005 |
| GB | 840543 | 11/1960 |

*Primary Examiner* — Phutthiwat Wongwian
*Assistant Examiner* — Loren Edwards
(74) *Attorney, Agent, or Firm* — Norton Rose Fulbright Canada LLP

(57) ABSTRACT

A stator airfoil of a gas turbine engine according to one embodiment includes at least two winglets projecting transversely from opposed sides of a stator airfoil, respectively. Each winglet includes a leading edge axially and outwardly extending from one of the opposed sides of the stator airfoil and a trailing edge extending from the stator airfoil to join with the leading edge of the winglet. The winglets therefore provide a wide trailing edge thereof to aerodynamically manage boundary layers and micro-shocks of a working fluid.

18 Claims, 3 Drawing Sheets

(56) References Cited

U.S. PATENT DOCUMENTS

| | | | |
|---|---|---|---|
| 4,128,363 A * | 12/1978 | Fujikake | F01D 5/145 416/175 |
| 4,720,239 A | 1/1988 | Owczarek | |
| 8,573,945 B2 | 11/2013 | Wang et al. | |
| 2011/0014028 A1 * | 1/2011 | Wood | F01D 25/12 415/1 |

* cited by examiner

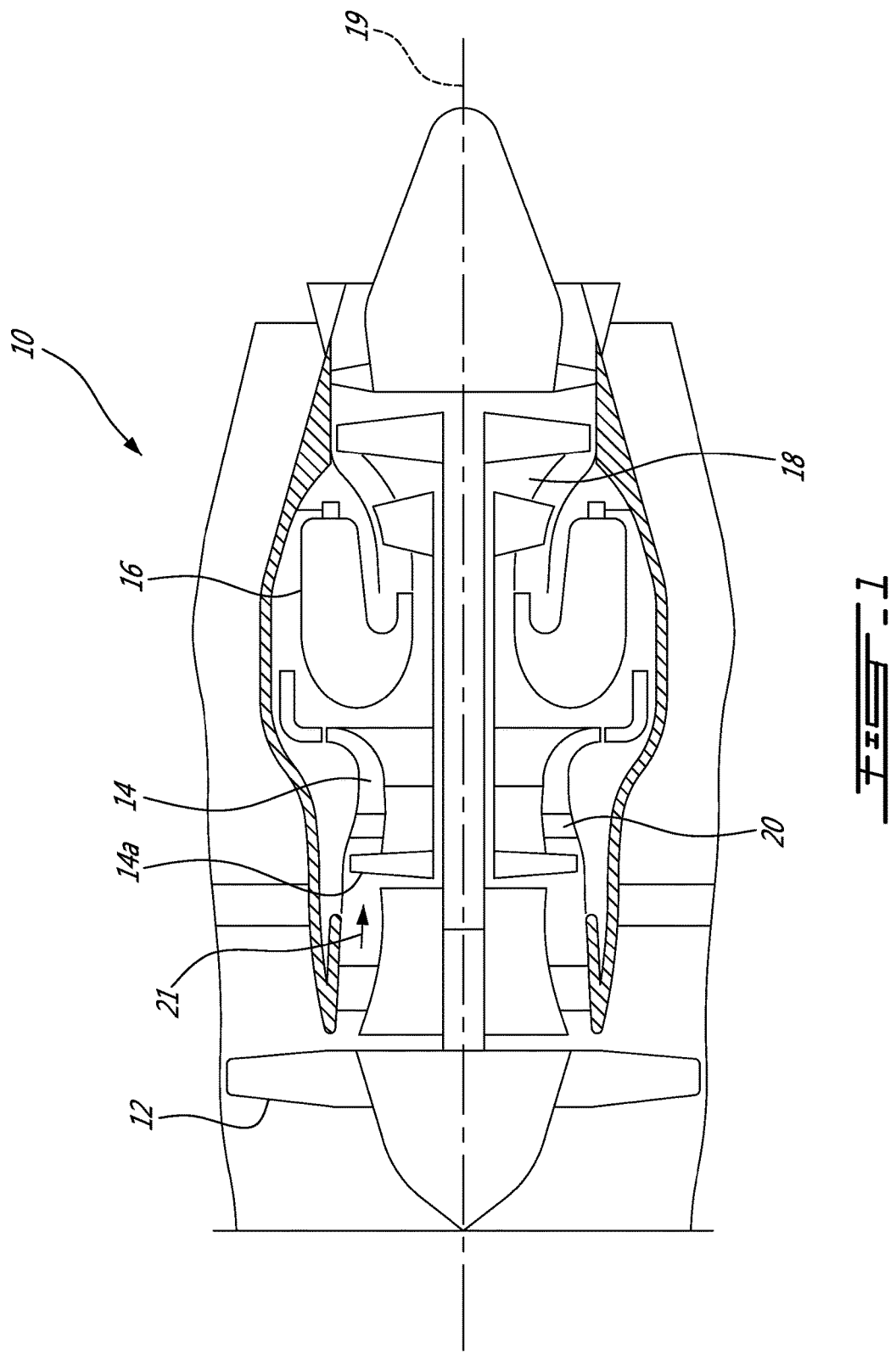

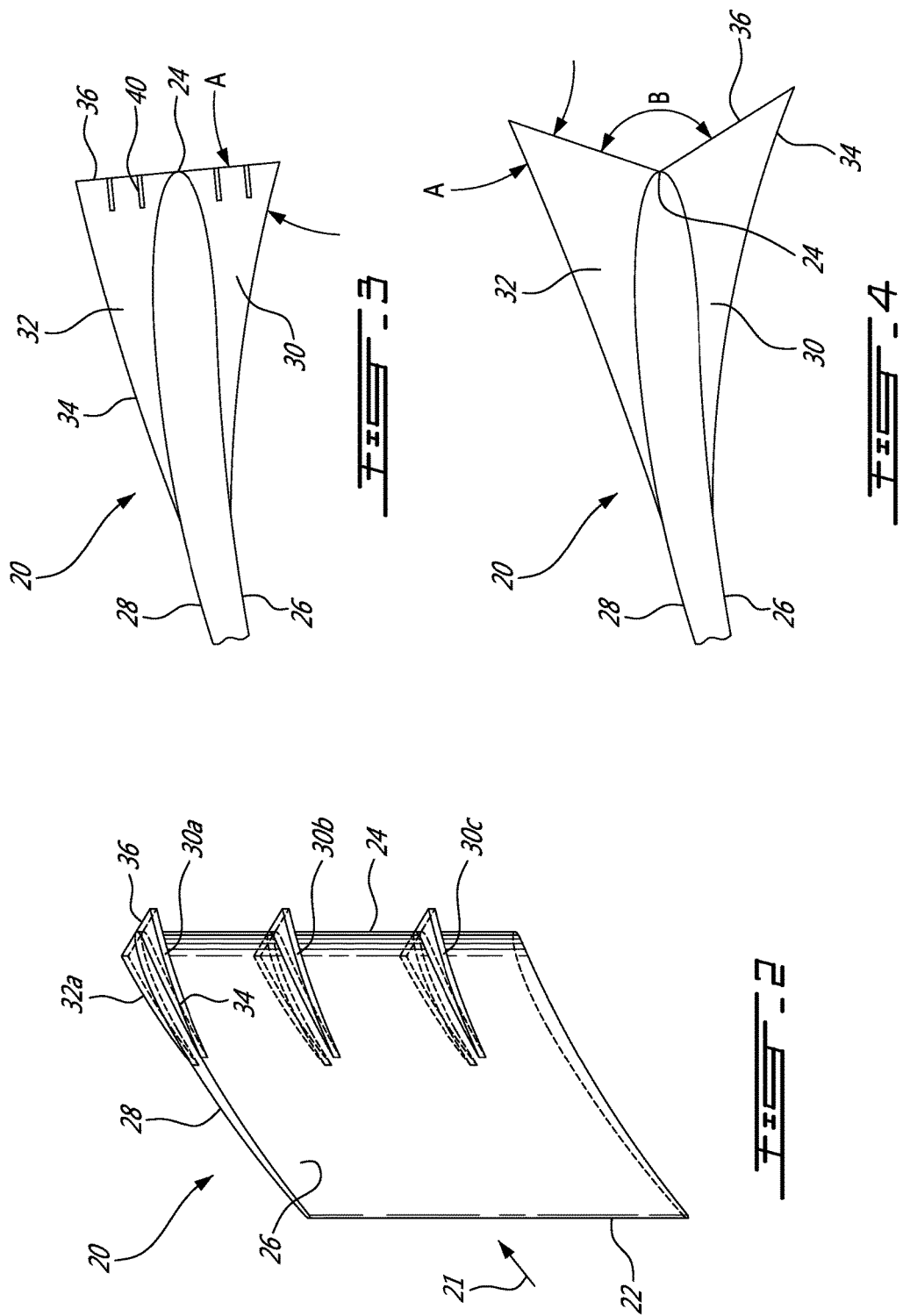

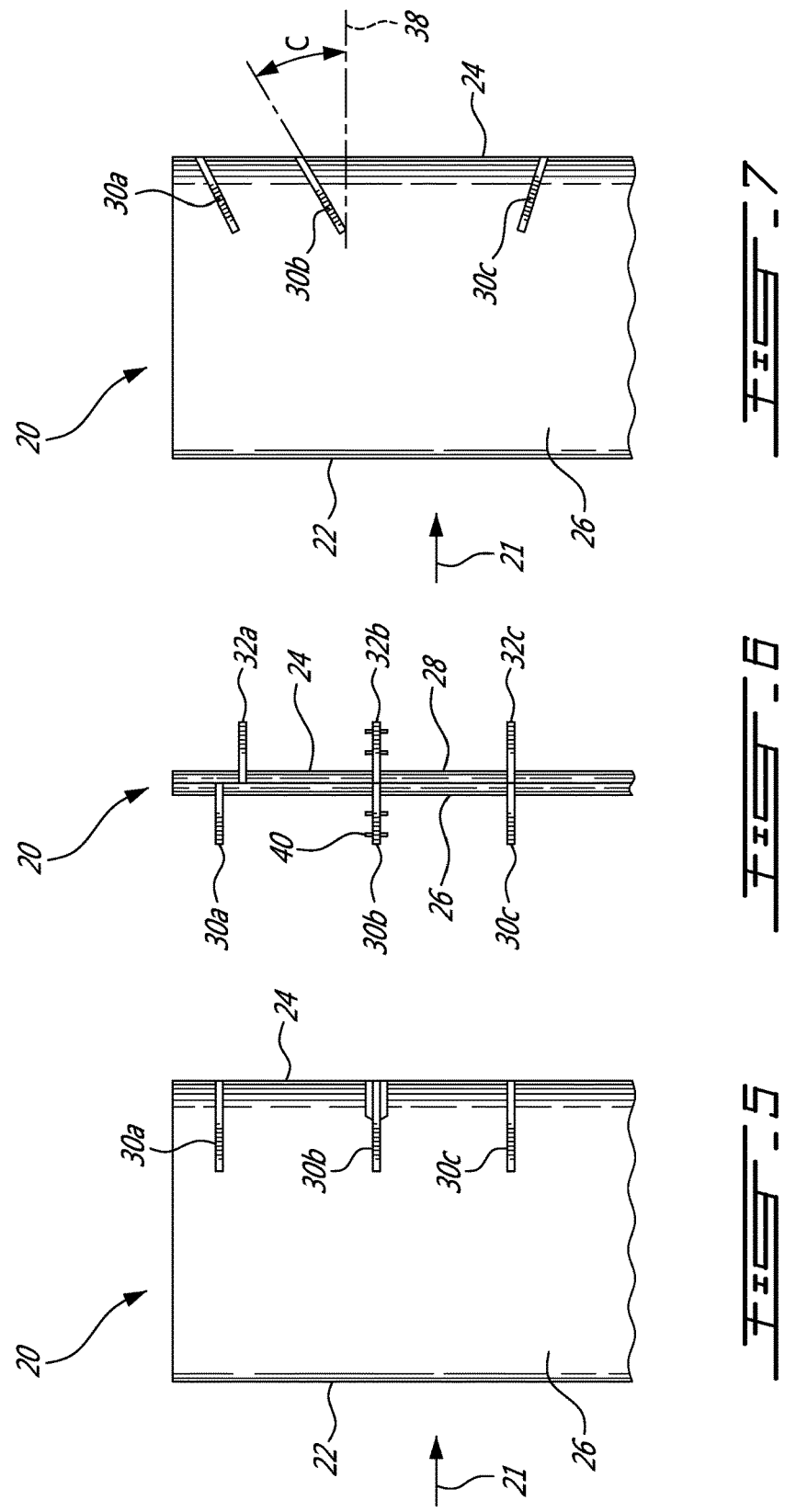

GAS TURBINE STATOR WITH WINGLETS

TECHNICAL FIELD

The application relates generally to gas turbine engines, and more particularly, to stator airfoils for such engines.

BACKGROUND OF THE ART

Compressors and turbines of gas turbine engines typically include alternating rows of rotor blades and stator vanes in gas flow passages. Engine performance is directly related to the aerodynamic characteristics of the blades and vanes. Efforts have been made to improve the structure and profile of the blades and vanes. For example, in some gas turbine engines guide vanes may have a rib attached to opposed sides of the vanes, extending in the direction of a gas flow for dampening vibrations of the vane. In some gas turbine engines, blades or vanes may be provided with one or more transverse fins, each fin extending across both faces of the blade or vane in order to minimize the formation of vortices in the working fluid flowing within the curved channel formed between adjacent blades or vanes.

Nevertheless, there is still a need to provide improved stator airfoils to further improve engine performance.

SUMMARY

In one aspect, there is provided a stator of a gas turbine engine, the stator comprising: a stator airfoil having leading and trailing edges and opposed pressure and suction sides extending between the leading and trailing edges; at least two winglets projecting transversely from the respective opposed pressure and suction sides of the stator airfoil, the winglets configured to generate an aerodynamic load on the stator airfoil and each including a winglet leading edge extending axially and outwardly from the corresponding pressure or suction side of the stator airfoil and a winglet trailing edge extending from the stator airfoil to join with the winglet leading edge.

In another aspect, there is provided a gas turbine engine comprising at least one compressor, a combustor and at least one turbine, the at least one compressor having a plurality of circumferentially spaced stator airfoils downstream of a compressor rotor, having a plurality of compressor blades, rotating about a central axis of the engine and positioned upstream of the stator airfoils, each stator airfoil including radially extending leading and trailing edges and opposed first and second sides extending substantially axially between the leading and trailing edges, and a plurality of winglets configured to generate an aerodynamic load on the stator airfoil and projecting transversely from the first and second opposed sides of the stator airfoil, respectively, each said winglet including a winglet leading edge axially and outwardly extending from one of the opposed sides of the stator airfoil and a winglet trailing edge extending from a trailing edge of the stator airfoil to join with the winglet leading edge.

DESCRIPTION OF THE DRAWINGS

Reference is now made to the accompanying drawings.

FIG. 1 is a schematic side cross-sectional view of a gas turbine engine as an example illustrating application of the described subject matter.

FIG. 2 is a schematic perspective view of a stator airfoil used in the engine of FIG. 1, having winglets secured thereto according to one embodiment.

FIG. 3 is a schematic partial top plan view of a stator airfoil having winglets according to the embodiment of FIG. 2.

FIG. 4 is a schematic partial top plan view of a stator airfoil having winglets according to another embodiment.

FIG. 5 is a schematic partial side elevational view of a stator airfoil having winglets according to further embodiment.

FIG. 6 is a schematic partial rear elevational view of a stator airfoil having winglets according to a still further embodiment.

FIG. 7 is a schematic partial side elevational view of a stator airfoil having winglets according to a still further embodiment.

It will be noted that throughout the appended drawings, like features are identified by like reference numerals.

DETAILED DESCRIPTION

FIG. 1 illustrates a gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The compressor 14 includes at least one axial compressor stage including a rotor, having a plurality of circumferentially spaced apart compressor rotor blades 14a, rotating about a central axis 19 of the engine 10 and a plurality of circumferentially spaced stator vanes comprising stator airfoils 20 positioned downstream of the compressor rotor blades 14a for redirecting and compressing airflow indicated by arrows 21 received form the compressor blades 14a.

The terms "radially", "axially" and "circumferentially" used throughout the description and appended claims, are defined with respect to the central axis 19 of the engine 10.

Referring to FIGS. 1-7, each of the stator airfoils 20 may be supported within a casing of the engine 10 and may include a leading edge 22 and a trailing edge 24 which both typically, although not necessarily, extend substantially radially with respect to the direction of the airflow 21, and include opposed pressure and suction sides 26, 28 of the airfoil that extending substantially axially between the leading and trailing edges 22, 24 thereof.

As seen in FIGS. 3 and 4, the stator airfoil 20 according to one embodiment may include at least two winglets 30 and 32 (for example, a pair of opposed winglets) extending from the respective opposed pressure and suction sides 26, 28 of the stator airfoil 20. Alternatively, more winglets such as indicated by 30a-30c and 32a-32c, may also extend from the respective opposed sides 26, 28 of the stator airfoil 20. The winglets 30, 30a-30c and 32, 32a-32c may be integrally formed with the main body of the airfoil 20, or may alternately secured to the respective sides 26, 28 of the airfoil using appropriate attachment methods such as welding, etc. Each pair of opposed winglets 30 and 32 may, in one embodiment, be disposed at a common span-wise location on the stator airfoil 20. However, it remains possible that the two winglets of each said pair are alternately off-set in the span-wise direction (i.e. extending between radially inner root and radially outer tip of the airfoil) along the airfoil 20.

Each of the winglets 30 and 32 (including 30a-30c and 32a-32c which will not be repeated hereinafter for convenience of description) according to one embodiment may have a triangular shape in a top plan view of the airfoil (e.g. FIGS. 3-4), and may be formed by a plate projecting transversely from one of the opposed sides 26, 28 of the stator airfoil 20. Each winglet 30, 32 includes a leading edge 34 and a trailing edge 36 with respect to the direction of the airflow 21. The leading edge 34 extends axially and outwardly from one of opposed sides 26, 28 of the stator airfoil 20, and the trailing edge extends from the trailing edge 24 of the stator airfoil 20 toward and being joined with the leading edge 34 of the winglet 30 or 32. In one embodiment, the leading edge 34 may form a straight line extending axially and outwardly from the opposed side of the stator airfoil, and the trailing edge 36 may also form a straight line. However, it is to be understood that while these leading and trailing edges may be substantially straight, slight curvatures therein may also be possible. The term "triangular" as used herein is intended to include any generally triangular shape, whether or not the leading and trailing edges form precisely straight line edges, and whether or not the corner formed at the junction of the leading edge and the trailing edge has a rounded radius of curvature. While FIGS. 3 and 4 depict embodiments of such a triangular shaped winglet 30, other at least partially triangular shapes remain possible. Alternate shapes of the winglets are described further below.

The leading edge 34 and the trailing edge 36 of the winglet 30 or 32 according to one embodiment, may define an angle A therebetween which is equal to or less than 90 degrees. The winglet leading and trailing edges accordingly define respective straight lines which intersect each other. These straight lines may lie within a common plane transverse to the airfoil, defined by the transversely extending body of the winglets 30, 32.

The trailing edge 36 of the winglet 30 on the side 26 and the trailing edge 36 of the winglet 32 on the side 28, extend in a downstream direction of the airflow 21 divergently from the trailing edge 24 of the stator airfoil 20 to form an angle B (see FIG. 4), defined between the two winglet trailing edges 36 of adjacent winglets 30 and 32. The angle B according to one embodiment may be less than or equal to 180 degrees. An angle B of less than 180 degrees is depicted in FIG. 4. An angle B of 180 degrees is depicted in FIG. 3.

The winglets 30 and 32 may be positioned in a same plane (see 30a and 32a shown in FIG. 2) or may be positioned in different planes (see 30a and 32a in FIG. 6). When the winglets 30 and 32 are positioned in the same plane, the trailing edges 36 of the winglets 30, 32 may align with each other to form a straight line (angle B is 180 degrees). Therefore, the winglets 30, 32 in combination form a delta wing-like configuration such as the delta wings of supersonic aircraft.

The triangular shape of the winglets 30, 32 according to the above-described embodiments provides a wide trailing edge 36 thereof to aerodynamically manage boundary layers and micro-shocks of the airflow 21 by reducing the component airflow speed and hence putting a larger load on the winglets with minimum aerodynamic losses. Different airflows will produce different loading because of the triangular winglet shape, much like the delta wing of a supersonic aircraft, reduces shocks and improves lift forces via boundary layer management.

Optionally, the winglets may be modified into other suitable shapes which provide the required wide trailing edges of the winglets, which may be configured to help the winglet to aerodynamically manage boundary layers and micro-shocks of the airflow 21.

The winglets 30a-30c and winglets 32a-32c may or may not be equally spaced apart in the radial direction depending on the geometry of the air passages and stator airfoils 20 as well as airflow 21 intake requirements.

The size and shape of the spaced apart winglets 30a-30c, or 32a-32c on each side of the stator airfoil 20 may or may not be identical. The winglets 30 and 32 on the respective opposed sides of the stator airfoil 20 may or may not be identical, particularly when the opposed sides 26, 28 of the airfoil stator 20 have different curvatures. Accordingly, the surface areas provided by each of the pressure side winglet 30 and the suction side winglet 32 may differ.

The spaced apart winglets 30a-30c and 32a-32c on the respective sides 26, 28 of the stator airfoil 20 may be positioned symmetrically with respect to the trailing edge 24 of the stator airfoil 20 as shown in FIG. 2, or may be positioned asymmetrically with respect to the trailing edge of the stator airfoil 20 as shown in FIG. 6, regardless of whether or not the size and shape of the winglets 30a-30c and 32a-32c are identical.

The winglets 30, 32 according to one embodiment may each be formed with a triangular plate which may be substantially flat, extending substantially parallel to the central axis 19 of the engine 10, such as winglets 30a-30c shown in FIG. 5. The winglets 30, 32 according to another embodiment may be formed each with the triangular plate which is positioned to define an acute angle C between the plate and a line 38 parallel to the central axis 19 of the engine 10, such as the position of winglet 30b shown in FIG. 7.

Optionally, the triangular plate of the winglets 30, 32 may be curved and may have various surface smoothness and/or roughness which would help to obtain desired aerodynamic conditions.

In a further embodiment the winglet 30 and/or 32 may further include one or more axially extending ridges 40 (See FIGS. 3 and 6) located adjacent the trailing edge 36 of the winglet 30 and/or 32 and may project radially outwardly from the flat triangular plate which forms the winglet 30 and/or 32, thereby potentially providing boundary layer control to the winglets and stiffening the winglets in a manner that is similar to the way the winglets may help to stiffen the stator airfoils by applying an aerodynamic load thereagainst. The ridges 40 may be integrated with the winglet 30 and/or 32 and may be secured to one or both opposed surfaces of the flat triangular plate which forms the winglet 30 and/or 32.

The winglets 30 and 32 may be integrally formed with a plastic coating layer of the stator airfoil 20 during a plastic molding process. The winglets 30, 32 may be otherwise suitably secured to, or integrally formed with, the stator airfoil 20.

The above-described optional or alternative features in different embodiments provide further aerodynamic characteristics of the stator airfoils 20 to meet different working environment requirements.

Some of the above-described embodiments may not only aerodynamically manage the boundary layer and micro-shocks on stator airfoils as well as on the downstream rotor airfoils to improve engine performance, but may also for example advantageously stiffen the stator airfoils to reduce vibration and noise. This allows the flow to be directed in the core and into the bypass regions and can be adjusted accordingly to meet the split in mass flows. The angled winglets would modulate the inlet conditions to the downstream rotor airfoils thus helping to manage the micro-shocks generated in rotor airfoils. The winglet angle to be defined based on the aerodynamic characteristics of rotor airfoils.

The above description is meant to be exemplary only, and one skilled in the art will recognize that changes may be made to the embodiments described without departing from the scope of the described subject matter. Compressor stator vanes have been described in the above embodiments as an example of the application of the above-described subject matter. However, it should be understood that the applicable compressor stator vanes could be fan stator vanes and stator vanes in any subsequent compressor stages. The above-described subject matter may be applicable to other stator vanes in gas turbine engines such as but not limited to turbine vanes. Modifications which fall within the scope of the described subject matter will be apparent to those skilled in the art, in light of a review of this disclosure, and such modifications are intended to fall within the appended claims.

The invention claimed is:

1. A stator of a gas turbine engine, the stator comprising: a stator airfoil having leading and trailing edges and opposed pressure and suction sides extending between the leading and trailing edges; at least two winglets projecting transversely from the respective opposed pressure and suction sides of the stator airfoil, the winglets configured to generate an aerodynamic load on the stator airfoil to stiffen the stator airfoil, each of the winglets including a winglet leading edge and a winglet trailing edge which meet at an intersection point to define a triangular shaped winglet when viewed in a top plan view, the winglet leading edge extending axially and outwardly from the corresponding pressure or suction side of the stator airfoil beginning at a point thereon located axially between the leading edge and the trailing edge of the stator airfoil, and the winglet trailing edge extending from the trailing edge of the stator airfoil to join with the winglet leading edge at said intersection point.

2. The stator as defined in claim 1 wherein said at least two winglets include at least one pair of opposed winglets located a common span-wise location on the stator airfoil, said pair of opposed winglets forming, in combination, a delta wing shape.

3. The stator as defined in claim 1 wherein the winglet leading edge and the winglet trailing edge define an angle therebetween, at said intersection point, that is less than 90 degrees.

4. The stator as defined in claim 1 wherein the winglet trailing edges of the two winglets align one with the other to form a straight line that is axially aligned with the trailing edge of the stator airfoil.

5. The stator as defined in claim 1 wherein the winglet trailing edges extend divergently from the trailing edge of the stator airfoil in a downstream direction relative to airflow over the stator airfoil.

6. The stator as defined in claim 5 wherein an angle defined between the winglet trailing edges of the two winglets is less than 180 degrees.

7. The stator as defined in claim 1 wherein each said winglet is formed with a plate having opposed substantially flat surfaces.

8. The stator as defined in claim 7 wherein each said winglet comprises at least one ridge located adjacent the winglet trailing edge, the at least one ridge projecting radially outwardly from one of the substantially flat surfaces of the flat plate and extending axially to terminate at the winglet trailing edge.

9. The stator as defined in claim 1 wherein the winglet leading edge and the winglet trailing edge of each said winglet define respective straight lines which intersect each other at said intersection point.

10. A gas turbine engine comprising at least one compressor, a combustor and at least one turbine, the at least one compressor having a plurality of circumferentially spaced stator airfoils downstream of a compressor rotor, having a plurality of compressor blades, rotating about a central axis of the engine and positioned upstream of the stator airfoils, each stator airfoil including radially extending leading and trailing edges and opposed first and second sides extending substantially axially between the leading and trailing edges, and a plurality of winglets configured to generate an aerodynamic load to stiffen the stator airfoil and projecting transversely from the first and second opposed sides of the stator airfoil, respectively, each said winglet including a winglet leading edge and a winglet trailing edge which meet at an intersection point to define a triangular shaped winglet when viewed in a plan view, the winglet leading edge extending axially and outwardly from one of the opposed sides of the stator airfoil beginning at a point thereon located axially between the leading edge and the trailing edge of the stator airfoil, and the winglet trailing edge extending from the trailing edge of the stator airfoil to join with the winglet leading edge at said intersection point.

11. The gas turbine engine as defined in claim 10 wherein the winglet leading edge and the winglet trailing edge define an angle therebetween, at said intersection point, that is less than 90 degrees.

12. The gas turbine engine as defined in claim 11 wherein the plurality of winglets include at least one pair of opposed winglets located at a common span-wise location on the stator airfoil, said pair of opposed winglets forming, in combination, a delta wing shape.

13. The gas turbine engine as defined in claim 10 wherein each stator airfoil comprises two or more of said winglets on each of the opposed first and second sides of the stator airfoil, the two or more of said winglets being radially spaced apart from one another.

14. The gas turbine engine as defined in claim 10 wherein at least one of the winglets is formed by a plate extending substantially parallel to the central axis of the engine.

15. The gas turbine engine as defined in claim 10 wherein at least one of the winglets is formed by a plate positioned to define an oblique angle between the plate and a line parallel to the central axis of the engine.

16. The gas turbine engine as defined in claim 10 wherein the winglet trailing edge of one of the winglets on the first side and the winglet trailing edge of one of the winglets on the second side each extend in a downstream direction of the airflow and divergently from the trailing edge of one of the stator airfoils to form an angle of less than 180 degrees between the winglet trailing edges of the respective winglets.

17. The gas turbine engine as defined in claim 10 wherein at least one winglet comprises at least one ridge projecting radially outwardly therefrom and located adjacent the trailing edge of the at least one winglet, the at least one ridge extending axially in a flow-wise direction and terminating at the trailing edge of the at least one winglet.

18. The gas turbine engine as defined in claim 10 wherein the winglets are integrally formed with the stator airfoil.

* * * * *